(12) United States Patent
Navalur

(10) Patent No.: US 9,152,542 B2
(45) Date of Patent: Oct. 6, 2015

(54) AUTOMATIC GENERATION OF TEST SCRIPTS

(71) Applicant: Asif Iqbal Navalur, Bangalore (IN)

(72) Inventor: Asif Iqbal Navalur, Bangalore (IN)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 13/804,711

(22) Filed: Mar. 14, 2013

(65) Prior Publication Data

US 2014/0281721 A1 Sep. 18, 2014

(51) Int. Cl.
G06F 11/00 (2006.01)
G06F 11/36 (2006.01)

(52) U.S. Cl.
CPC .................. G06F 11/3684 (2013.01)

(58) Field of Classification Search
USPC ........................................................... 714/33
See application file for complete search history.

(56) References Cited

U.S. PATENT DOCUMENTS

| | | | | |
|---|---|---|---|---|
| 7,299,382 B2* | 11/2007 | Jorapur | ...................... | 714/38.14 |
| 7,613,953 B2* | 11/2009 | Voruganti | ..................... | 714/38.1 |
| 7,627,843 B2* | 12/2009 | Dozorets et al. | .............. | 716/106 |
| 7,895,565 B1* | 2/2011 | Hudgons et al. | .............. | 717/106 |
| 8,230,263 B2* | 7/2012 | Mukherjee et al. | ............. | 714/33 |
| 8,434,058 B1* | 4/2013 | Hudgons et al. | .............. | 717/106 |
| 8,683,446 B2* | 3/2014 | Paradkar et al. | .............. | 717/126 |
| 2003/0188224 A1* | 10/2003 | Decker | .......................... | 714/25 |
| 2003/0204784 A1* | 10/2003 | Jorapur | .......................... | 714/38 |
| 2004/0078673 A1* | 4/2004 | Decker | .......................... | 714/33 |
| 2005/0081094 A1* | 4/2005 | Kadkade et al. | ................ | 714/12 |
| 2006/0064570 A1* | 3/2006 | di Savoia | ...................... | 712/227 |
| 2006/0218513 A1* | 9/2006 | Dozorets et al. | ................... | 716/5 |
| 2007/0038977 A1* | 2/2007 | Savage | ......................... | 717/106 |
| 2008/0313611 A1* | 12/2008 | Linville et al. | ................ | 717/115 |
| 2009/0018811 A1* | 1/2009 | Paradkar et al. | ................. | 703/22 |
| 2013/0086558 A1* | 4/2013 | Merino et al. | ................ | 717/128 |
| 2013/0191687 A1* | 7/2013 | Ben-Yehuda et al. | .......... | 714/25 |
| 2013/0205172 A1* | 8/2013 | Hudgons et al. | ............. | 714/38.1 |

* cited by examiner

*Primary Examiner* — Kamini Patel
(74) *Attorney, Agent, or Firm* — Schwegman Lundberg & Woessner, P.A.

(57) ABSTRACT

Systems and methods for automatically generating test scripts are described. The systems and methods may access information from a template that includes at least one entry associated with a test case to be applied to a system under testing, apply a translation scheme to the accessed information, and generate a test script in a language that is associated with the translation scheme and that is based on the information accessed from the template. The systems and methods may then utilize the test script to test the functionality of a system under testing, among other things.

18 Claims, 7 Drawing Sheets

AUTOMATIC GENERATION OF TEST SCRIPTS

TECHNICAL FIELD

The subject matter disclosed herein generally relates to the processing of data and, for example, to the automatic generation of test scripts.

BACKGROUND

Typically, there are many steps involved in order to test the functionality of software. For example, the steps may include a manual tester writing out a business scenario or test case, a series of meetings between the manual tester and a test script developer, a test script developer creating test scripts from information derived from the business scenario and the meetings, and so on. Thus, these steps often require many different people associated with the generation of a test script, which may be time and resource consuming for an organization, among other things.

BRIEF DESCRIPTION OF THE DRAWINGS

The present technology is illustrated by way of example, and not by way of limitation, in the figures of the accompanying drawings.

DETAILED DESCRIPTION

Overview

Systems and methods for automatically generating test scripts are described. The systems and methods may include accessing information from a template that includes at least one entry associated with a test case to be applied to a system under testing, applying a translation scheme to the accessed information, and generating a test script in a language that is associated with the translation scheme and that is based on the information accessed from the template. The systems and methods may then utilize the test script to test the functionality of a system under testing, among other things.

For example, the systems and methods may provide a template that includes entries (e.g., rows in a spreadsheet) associated with scenarios to be used when testing a new system, such as a new graphical user interface system. The spreadsheet may facilitate the input of information (e.g., control name information, element type information, operation type information, set value information, and so on) for each of the entries into a structured format. A translator may access the spreadsheet, translate the information into a desired scripting language, and generate a test or automation script that is based on the information contained in the spreadsheet.

By providing a template through with to receive information associated with testing a system, such as software, the systems and methods facilitate an efficient and effective generation of automation scripts to be used in testing systems, without requiring time consuming manual information exchanges, among other benefits.

In the following description, for purposes of explanation, numerous specific details are set forth to provide a thorough understanding of example embodiments. It will be evident to one skilled in the art, however, that the present subject matter may be practiced without these specific details.

Example Computing Environment

Figure 1:
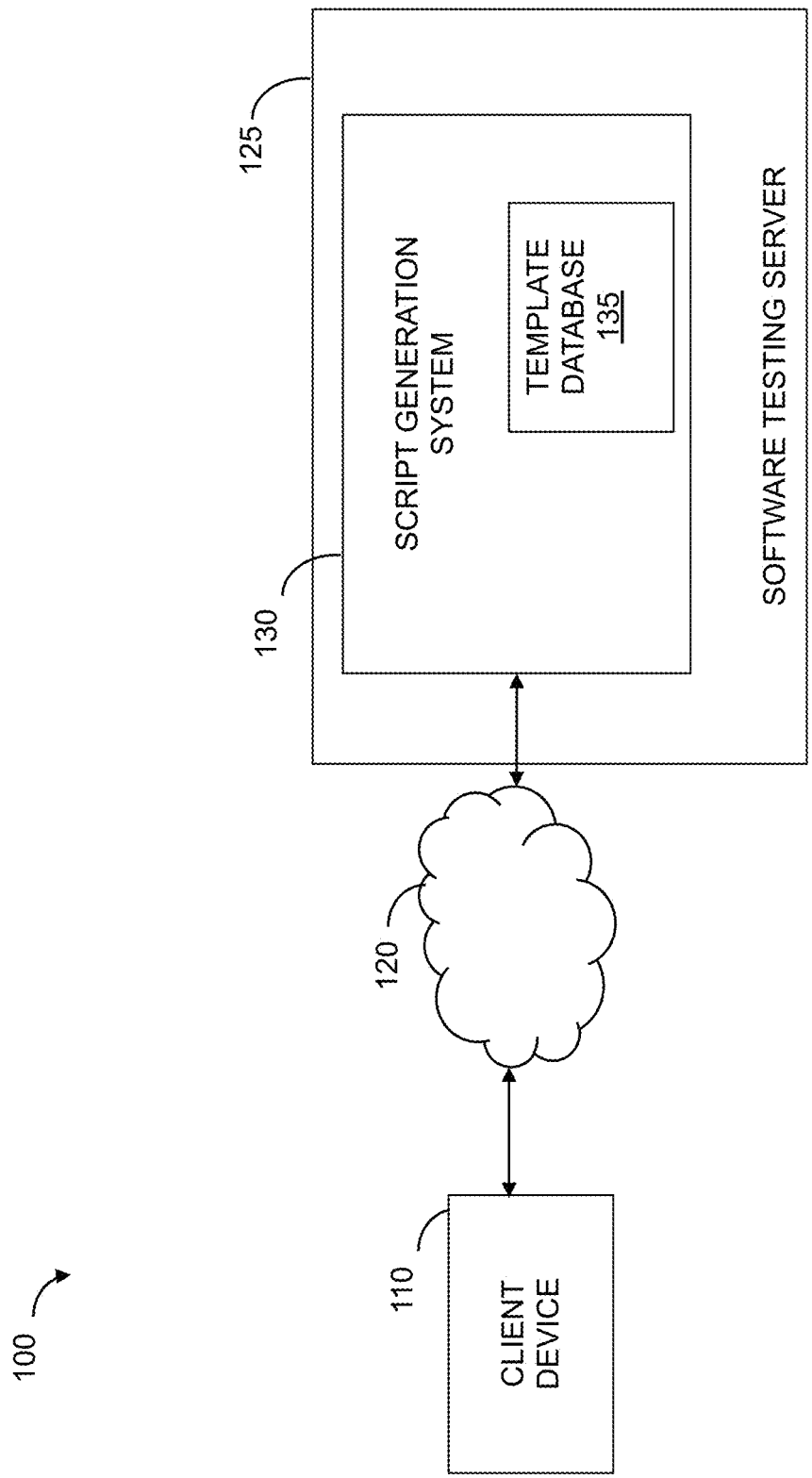
FIG. 1 is a network diagram illustrating a network environment for generating test scripts, in some example embodiments.

FIG. 1 is a network diagram illustrating a network environment 100 for automatically generating test scripts, in some example embodiments. The network environment 100 may include one or more client devices 110 that access a script generation system 130 supported by a testing server 125 via a network 120, such as the Internet. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed herein with respect to FIG. 7.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 120 may be any network that enables communication between or among machines, databases, and devices. Accordingly, the network 120 may be a wired network, a wireless network (e.g., a mobile or cellular network), a storage area network (SAN), or any suitable combination thereof. The network 120 may include one or more portions of a private network, a public network (e.g., the Internet), or any suitable combination thereof.

The script generation system 130 may include and/or access a template database 135 or other component that stores one or more templates configured to receive information associated with test cases or business scenarios to be applied to software being tested and provide the information in a structured format to translators and script generators configured to generate test scripts that are based on the information, among other things.

For example, the script generation system 130 may cause a user interface supported by the client device 110 to display a template in spreadsheet form to a manual tester associated with the client device 110. The manual tester may input information into the displayed template via the client device 110. The script generation system 130 may then access the information, translate the information into a suitable script language, and generate a test script that is based on the information contained in the template.

Examples of Generating Test Scripts

Figure 2:
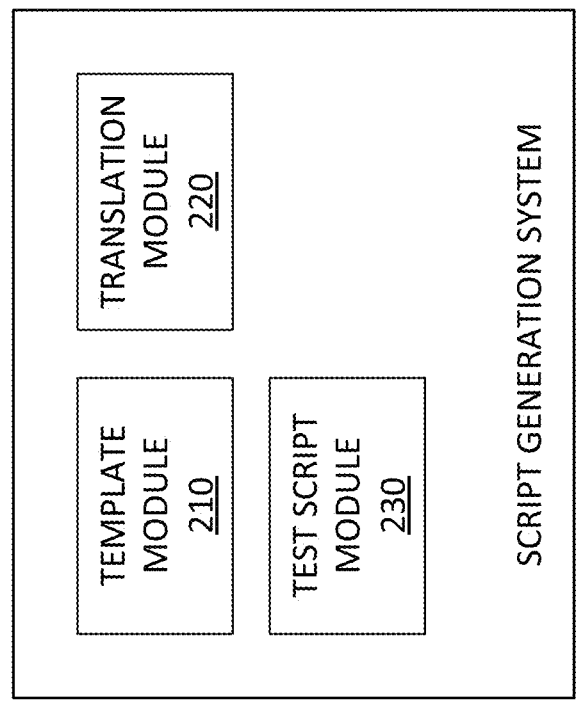
FIG. 2 is a block diagram illustrating the components of a script generation system, in some example embodiments.

As described herein, the script generation system 130 is configured to generate test scripts using information contained in a template, among other things. FIG. 2 is a block diagram illustrating the components of the script generation system 130, in some example embodiments.

In some example embodiments, the script generation system 130 may include one or more modules and/or components to perform one or more operations of the script generation system 130. The modules may be hardware, software, or a combination of hardware and software, and may be executed by one or more processors. For example, the script generation system 130 may include a template module 210, a translation module 220, and a test script module 230.

In some example embodiments, the template module 210 is configured and/or programmed to access information from a template that includes at least one entry associated with a test case to be applied to a system under testing. For example, the template module 210 may access information contained in a spreadsheet (e.g., an EXCEL spreadsheet) or other structured file that organizes information in a tabular form. For example, the spreadsheet may organize information in a series of cells that store raw data and/or formulas that compute values, such as values computed from the data stored in the cells. The cells may contain information associated with a business scenario, such as information identifying an action to be performed during an automated test, information identifying an operation to be performed during an automated test, information identifying a value or value format to be received as input during an automated test, and so on. The template module 210 may access one or more templates stored in the template database 135. For example, the template database 135 may include various different templates that are associated with test cases and that contain information provided by manual testers or other users related to the test cases. Example types of information that may be contained in the template include:

Identification information, such as information that identifies a faction to be performed during an automated test (e.g., may be a serial number, such as 7.5.10.10, that represents a performable function;

Control name information, such as information that identifies a control, button, or other element of the software (e.g., a browser, an editbox, a button) under testing;

Type information, such as information that identifies a type of control performed during an automated test (e.g., an editbox being tested);

Operation information, such as information that identifies an operation performed by the control under testing (e.g., navigating a browser, or setting a value in an edit box);

Value information, such as information that identifies a received or input value (e.g., an alphanumeric value such as a username or password); and/or Property information, such as information that identifies a property for a received value (e.g., an HTML tag, a password format); and so on.

In some example embodiments, the template module 210 may access a document that contains written test cases or business scenarios (e.g., cases written in plain language), and automatically populate the template with information derived from the written document. For example, the template module 210 may access a document that includes a written test case, derive control name information, type information, operation information, and value information from the written test case, and automatically insert the derived information into an entry of the template that is associated with the written test case. Thus, the script generation system 130 may not require a user to enter the information into the template, and instead extract the information from previously prepared test cases, among other things.

In some example embodiments, the translation module 220 is configured and/or programmed to apply a translation scheme to the accessed information. For example, the translation module 220 may convert or otherwise translate the information from the template into a scripting language, such as the Visual Basic Scripting Edition (VBScript) language (e.g., for testing performed in the HP Quicktest Professional (QTP) testing environment), or other programming languages, such as JavaScript, C#, Groovy, Perl, Python, Ruby, and so on (e.g., for testing performed via the Selenium software testing framework).

In some example embodiments, the translation module 220 may convert information that has been translated from one language to another. For example, the translation module 220 may receive the information after it was translated into Ruby to be used for Selenium framework, and convert the information into VBScript, to be utilized by the QTP environment.

In some example embodiments, the test script module 230 is configured and/or programmed to generate a test script in a language that is associated with a translation scheme and that is based on the information accessed from the template. For example, the test script module 230 may generate a set of instructions to be performed on a system that is being tested in order to determine that the system functions as expected or desired.

The test script module 230 may be part of or include a macro or other program configured to access the information and generate test scripts. For example, in some example embodiments, a spreadsheet, such as an EXCEL spreadsheet, may include a macro that contains the template module 210 that accesses information from the spreadsheet, the translation module 220 that translates the information, and the test script module 230 that generates a test script based on the information in the spreadsheet.

The test script module 230 may, in some example embodiments, generate a test script that includes multiple (e.g., two or more) code snippets, where each code snippet is associated with an entry in the template. Thus, the generated test script may include a section configured to test a system for every test case that has been input into the template that provided the information used to generate the test script.

Figure 3:
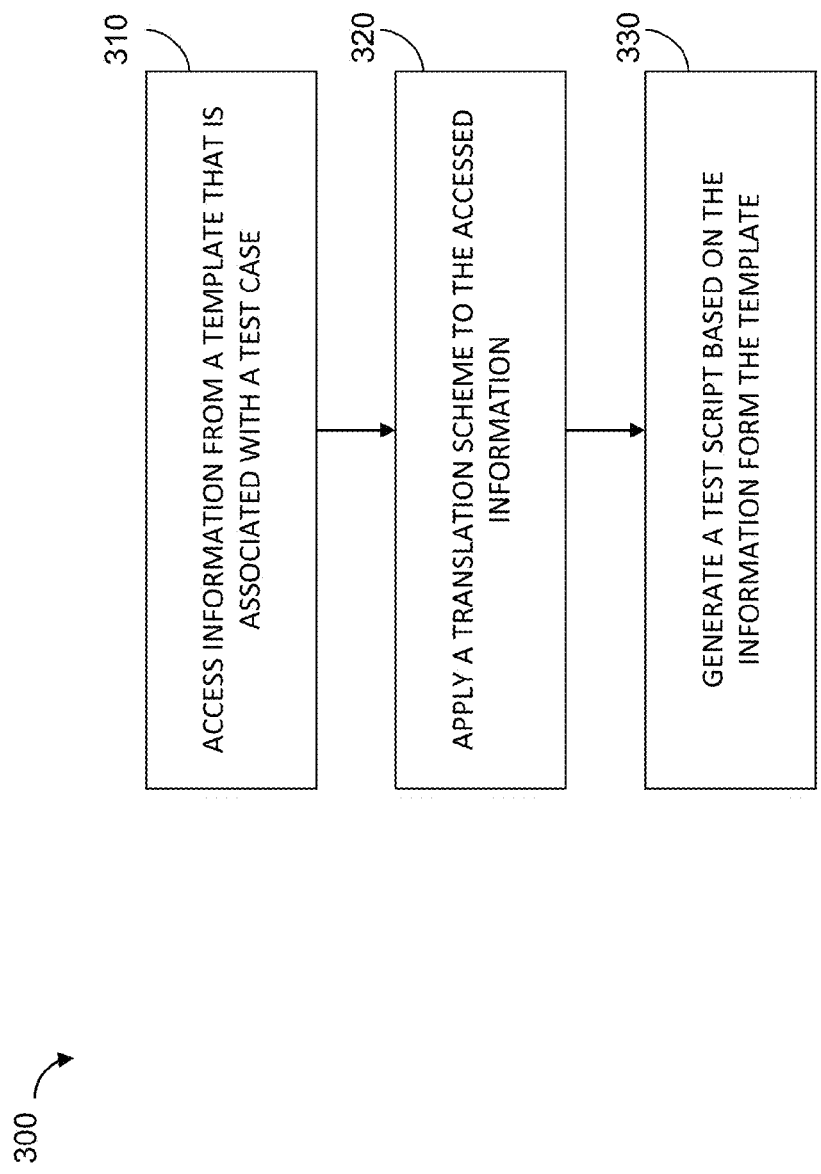
FIG. 3 is a flow diagram illustrating a method for generating a test script, in some example embodiments.

FIG. 3 is a flow diagram illustrating a method for generating a test script, in some example embodiments. The method 300 may be performed by the script generation system 130 and, accordingly, is described herein merely by way of reference thereto. It will be appreciated that the method 300 may be performed on any suitable hardware.

In operation 310, the script generation system 130 accesses information from a template that includes at least one entry associated with a test case to be applied to a system under testing. For example, the template module 210 accesses information contained in entries of a spreadsheet (e.g., a row of information represents a test case) that include various types of information associated with the test cases. As described herein, the template module 210 may access control name information, type information, operation information, value information, and/or property information from the spreadsheet, among other things.

In operation 320, the script generation system 130 applies a translation scheme to the accessed information. For example, the translation module 220 translates the accessed information into a desired language, such as a scripting language, a programming language, and/or other languages described herein.

In operation 330, the script generation system 130 generates a test script in a language that is associated with the translation scheme and that is based on the information accessed from the template. For example, the test script module 230 generates a test script in the translation scheme that includes the information within the template.

The test script module 230 may generate test scripts for a variety of purposes. For example, the generated test scripts may be used within a software testing environment (e.g., supported by the software testing server 125) to perform functional testing on a system using functional test scripts and/or to perform regression testing on a system using regression test scripts.

Figure 4:
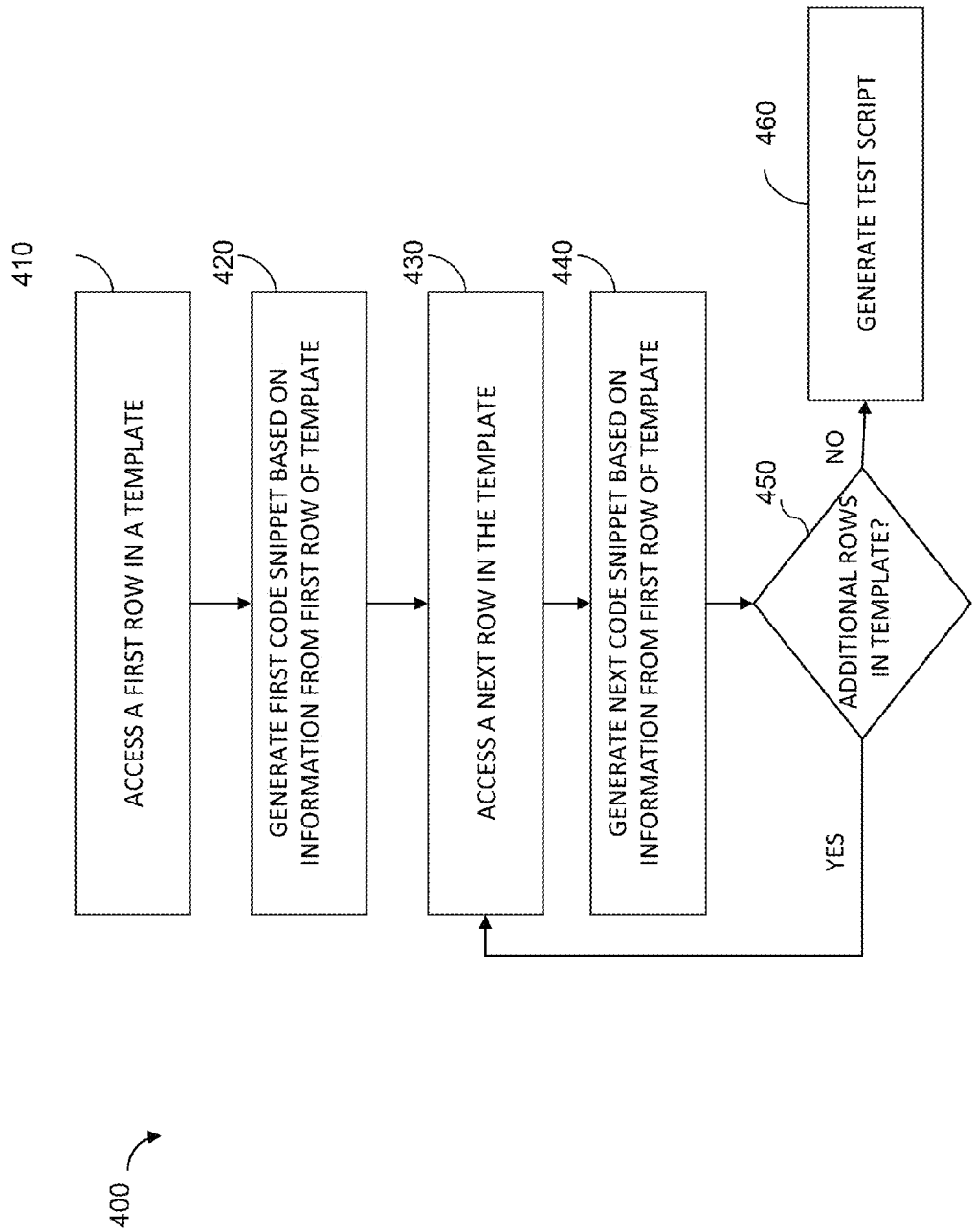
FIG. 4 is a flow diagram illustrating a method for generating a test script of code snippets, in some example embodiments.

As described herein, the script generation system 130 generates test scripts that include sections associated with various different test cases to be performed on a system. FIG. 4 is a flow diagram illustrating a method 400 for generating a test script of code snippets, in some example embodiments. The method 400 may be performed by the script generation system 130 and, accordingly, is described herein merely by way of reference thereto. It will be appreciated that the method 400 may be performed on any suitable hardware.

In operation 410, the script generation system 130 accesses a first row of a template that includes information associated with a test case. For example, the template module 210 accesses a first row of a template that is associated with testing the entry of a login name for a system under testing (e.g., a user interface of a website).

In operation 420, the script generation system 130 generates a first code snippet that is based on the information from the first row of the template. For example, the translation module 220 and the test script module 230 generate a function in the Visual Basic for Applications (VBA) language that sets a value of the login name for an edit box of the user interface.

In operation 430, the script generation system 130 accesses a next or subsequent row of the template that includes information associated with another test case. For example, the template module 210 accesses a next row of the template that is associated with testing the entry of a password for the system under testing (e.g., the user interface of the website).

In operation 440, the script generation system 130 generates a second code snippet that is based on the information from the next row of the template. For example, the translation module 220 and the test script module 230 generate a function in VBA that sets a value of the password for an edit box of the user interface.

In operation 450, the script generation system 130 determines whether there are additional rows in the template to be accessed. When there are additional rows to be accessed, the script generation system 130 performs operation 430 and accesses the next or subsequent row in the template. When there are no additional rows to be accessed, the script generation system 130, in operation 460, generates a test script that includes the generated code snippets.

In some example embodiments, the script generation system 130 may utilize a macro associated with or provided by a template (e.g., a spreadsheet) in order to generate the test script. For example, the macro of the spreadsheet may convert a row of information that is associated with a test case into a code snippet in the VBA language.

Figure 5:
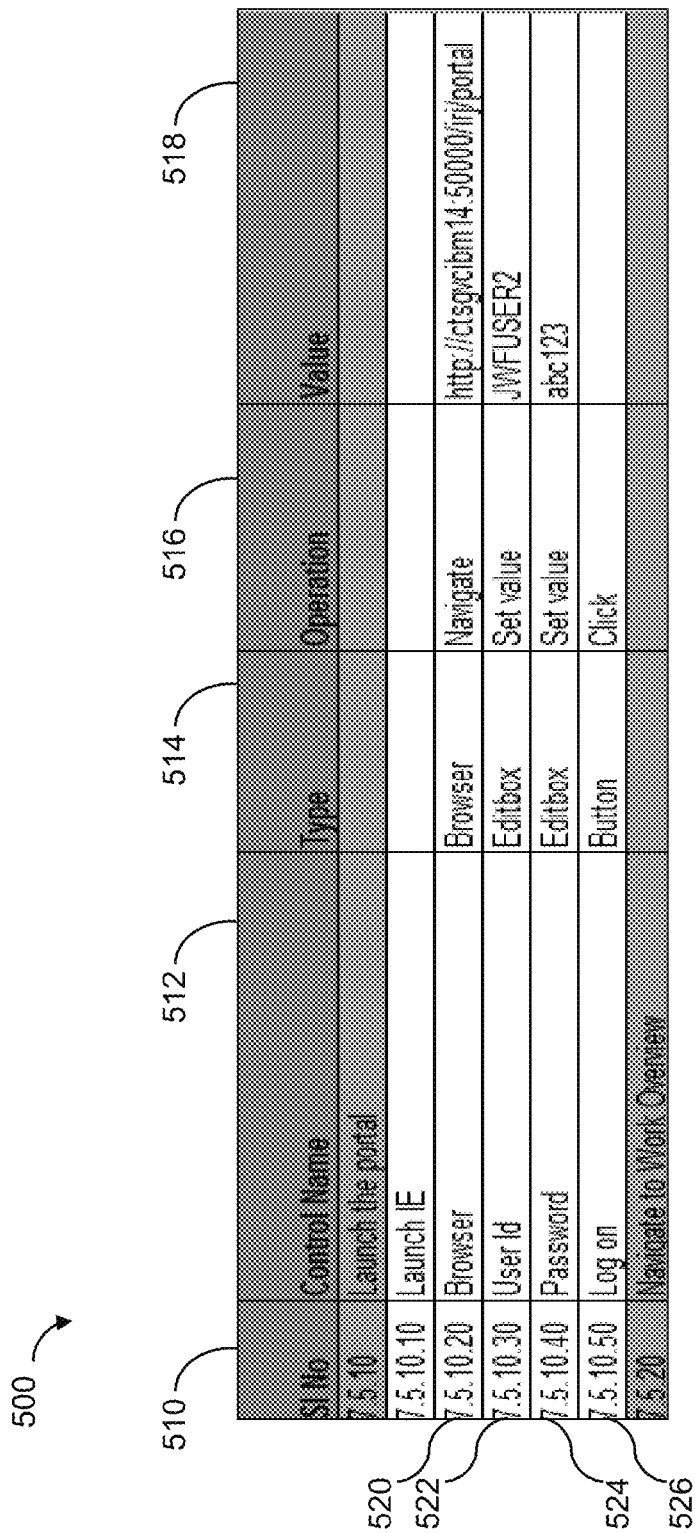
FIG. 5 is a diagram illustrating an example template for receiving test case information, in some example embodiments.

FIG. 5 is a diagram illustrating an example template 500, in spreadsheet form, for receiving test case information. The template 500 includes columns of types of information, including a column 510 of identification information (e.g., Serial information, or SI), a column 512 of control name information, a column 514 of function type information, a column 516 of operation type information, and a column 518 of value information. Of course, the template 500 may include additional columns of information not shown.

The template 500 includes rows of information that are associated with test cases, such as row 520 that is associated with a browser control test case, row 522 that is associated with a user ID entry test case, row 524 that is associated with a password entry test case, and row 526 that is associated with a test case for clicking a button to log onto a system. Of course, the template 500 may include additional rows of information not shown.

The template 500 may, in some example embodiments, facilitate the entry of information by providing drop-down boxes, by limiting the type of information that is permitted to be entered, and so on. For example, when a user is entering information into row 526 that is associated with the test case for clicking a button to log onto a system, the template 500 may restrict the input allowed to be entered into the operation type column 516 to "click" or "swipe over", whereas the template 500 may allow any alphanumeric input into the value column 518, among other things.

As an example, the test case associated with entry of a password is represented by the information contained in row 524, which was input by a manual tester. The row includes identification information 510 (e.g., "7.5.10.40"), control name information 512 (e.g., "password"), function type information 514 (e.g., "editbox"), operation type information 516 (e.g., "Set value"), and Value information 518 (e.g., "abc123"). The row of information, therefore, represents the test case. For example, the test case may be represented as a grouping of information, such as test case=[7.5.10.40, password, editbox, Set value, abc123].

Figure 6:
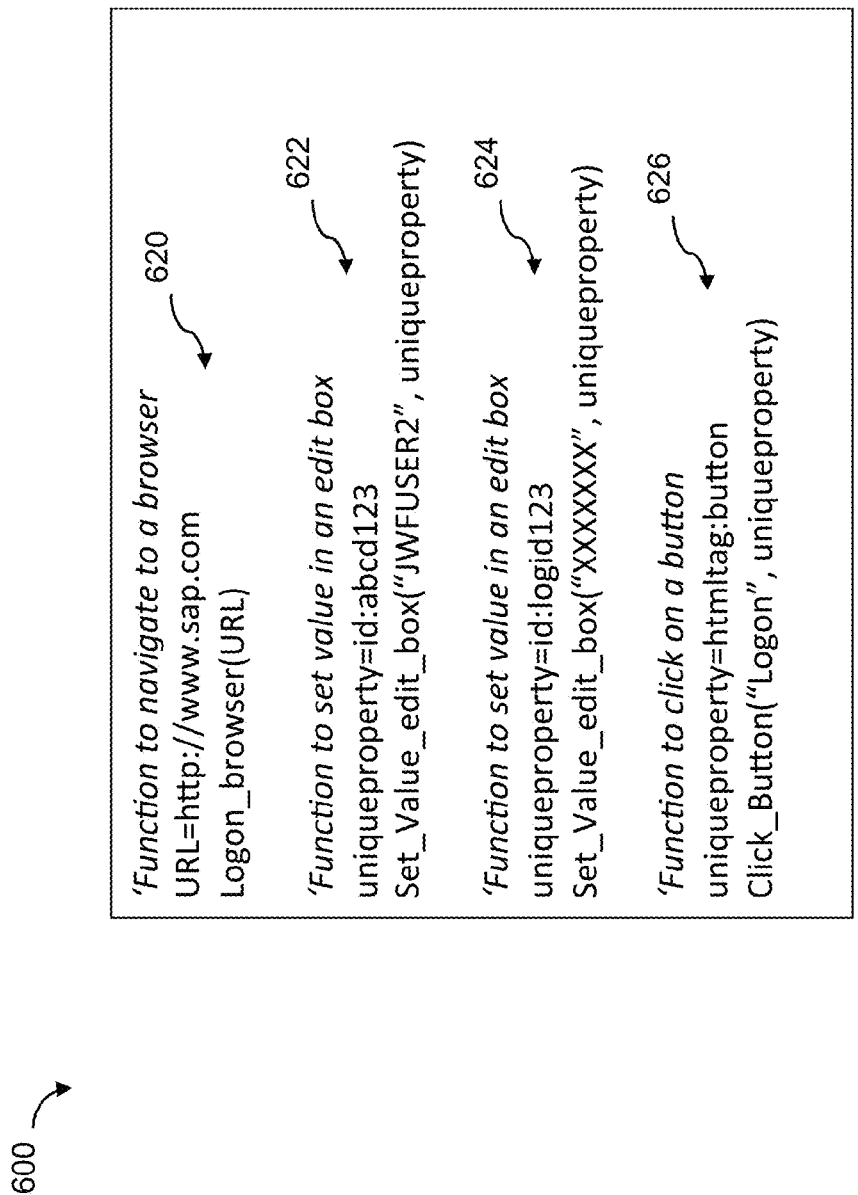
FIG. 6 is a diagram illustrating a generated test script, in some example embodiments.

The template 500 facilitates the entry of the information for a test case associated with password entry in a structured manner by a manual tester, which enables the script generation system 130 to automatically generate a test script using the information, among other things. FIG. 6 is a diagram illustrating a generated test script 600, in some example embodiments.

The test script module 230 may utilize a macro to generate the test script 600 in a VBA format, as is shown in the figure. The test script 600 includes code snippets that correspond to each of the identified entries of the template 500. For example, the test script 600 includes:

a code snippet 620, directed to a "function to navigate to a browser," that is generated from the information in row 520;

a code snippet 622, directed to a "function to set value in an edit box," that is generated from the information in row 522;

a code snippet 624, directed to a "function to set value in an edit box," that is generated from the information in row 524; and a code snippet 626, directed to a "function to click on a button," that is generated from the information in row 526.

The generated script 600 therefore, is based on information contained in the template 500, such as control name information 512, type information 514, operation information 516, value information 518, property information (when applicable), and so on.

Thus, in some example embodiments, the script generation system 130 described herein provides a template 500 that is configured to receive information associated with test cases from a user, and utilizes the information contained in the template 500 to automatically generate test scripts that are used to test a system, among other things. The script generation system 130, therefore, may provide for the automatic generation of automation scripts, providing a uniform quality of scripts, minimizing ambiguities associated with testing, eliminating or reducing script coding time and other inefficiencies associated with creating test scripts, and so on.

Figure 7:
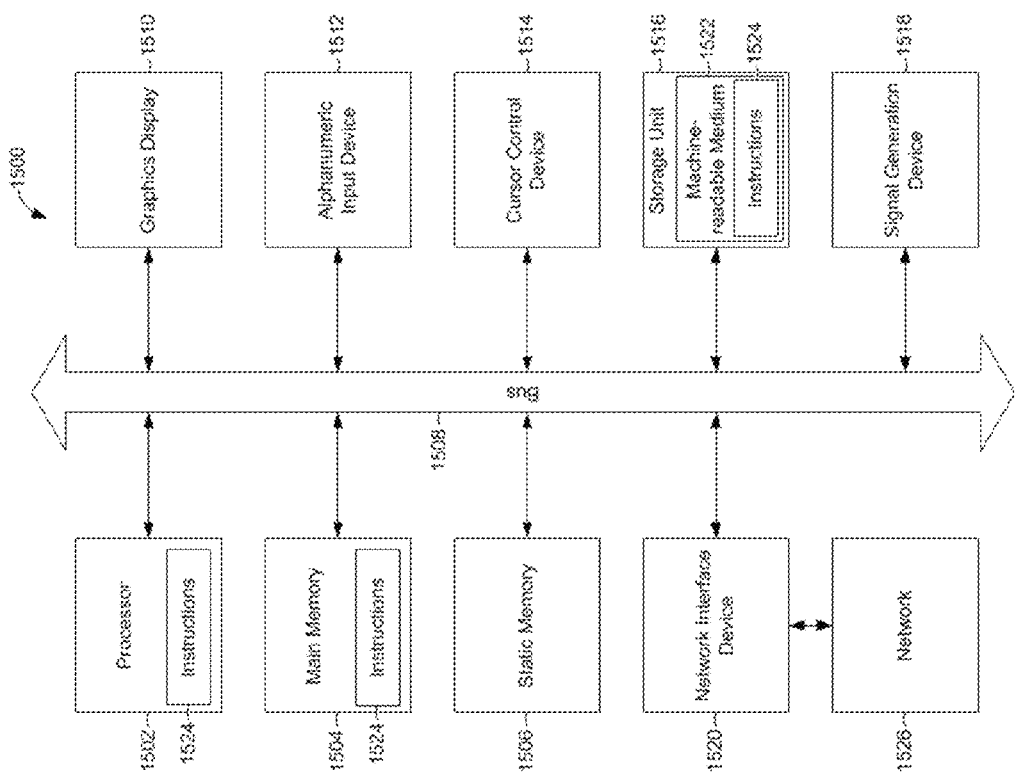
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 1500, according to some example embodiments, able to read instructions from a machine-readable medium (e.g., a machine-readable storage medium) and perform any one or more of the methodologies discussed herein, in whole or in part. Specifically, FIG. 7 shows a diagrammatic representation of the machine 1500 in the example form of a computer system and within which instructions 1524 (e.g., software, a program, an application, an applet, an app, or other executable code) for causing the machine 1500 to perform any one or more of the methodologies discussed herein may be executed. In alternative embodiments, the machine 1500 operates as a stand-alone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include a collection of machines that individually or jointly execute the instructions 1524 to perform any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The machine 1500 may further include a graphics display 1510 (e.g., a plasma display panel (PDP), a light emitting diode (LED) display, a liquid crystal display (LCD), a projector, or a cathode ray tube (CRT)). The machine 1500 may also include an alphanumeric input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a speaker), and a network interface device 1520.

The storage unit 1516 includes a machine-readable medium 1522 on which is stored the instructions 1524 embodying any one or more of the methodologies or functions described herein. The instructions 1524 may also reside, completely or at least partially, within the main memory 1504, within the processor 1502 (e.g., within the processor's cache memory), or both, during execution thereof by the machine 1500. Accordingly, the main memory 1504 and the processor 1502 may be considered as machine-readable media. The instructions 1524 may be transmitted or received over a network 1526 (e.g., network 120) via the network interface device 1520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 or computer-readable medium is shown in an example embodiment to be a single medium, the term "machine-readable medium" or "computer-readable medium" should be taken to include a single medium or multiple media (e.g., a centralized or distributed database, or associated caches and servers) able to store instructions. The term "machine-readable medium" or "computer-readable medium" shall also be taken to include any medium, or combination of multiple media, that is capable of storing instructions for execution by a machine or computer (e.g., machine 1500), such that the instructions, when executed by one or more processors of the machine or computer (e.g., processor 1502), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

We claim:

1. A computerized method, comprising:
   accessing, using at least one processor, information from a template having entries associated with test cases, the template organizing the information for the test cases in a tabular form with rows associated with the test cases, the information specifying a scripting language for a translation scheme associated with at least one of the test cases;
   applying the translation scheme to the accessed information for a test case to convert the information for the test case into the scripting language associated with the translation scheme for the test case; and
   generating a test script in the scripting language associated with the translation scheme for the test case based on the accessed information from at least one row of the information associated with the test case in the template, the test script including instructions to be performed on the system under test (SUT) for the test case.

2. The method of claim 1, wherein the accessed information from the template includes control name information, type information, operation information, value information, and property information associated with the test cases.

3. The method of claim 1, further comprising:
   accessing a document that includes a written test case;
   deriving control name information, type information, operation information, value information, or property information from the written test case; and automatically inserting the derived information into at least one row in the template that is associated with the written test case.

4. The method of claim 1, wherein the information contained in the template represents information from a user associated with the system under testing.

5. The method of claim 1, wherein the template is a spreadsheet that associates the rows to the test cases; and wherein a macro of the spreadsheet generates the test script.

6. The method of claim 1, further comprising:
applying a different translation scheme to the accessed information; and
generating a test script in the scripting language that is associated with the different translation scheme and that is based on the information accessed from the template.

7. The method of claim 1, wherein generating the test script includes generating the test script that includes a code snippet for each entry of the template that is associated with one of the test cases to be applied to the system under testing.

8. A system, comprising:
at least one processor configured to perform operations for processor-implemented modules including:
a template module configured to access information from a template having entries associated with test cases, the template organizing the information for the test cases in a tabular form with rows associated with the test cases, the information specifying a scripting language for a translation scheme associated with at least one of the test cases;
a translation module that is configured to apply the translation scheme to the accessed information for a test case to convert the information for the test case into the scripting language associated with the translation scheme for the test case; and
a test script module that is configured to generate a test script in the scripting language associated with the translation scheme for the test case based on the accessed information from at least one row of the information associated with the test case in the template, the test script including instructions to be performed on the system under test (SUT) for the test case.

9. The system of claim 8, wherein the template module is configured to access control name information, type information, operation information, value information, and property information associated with the test cases.

10. The system of claim 8, wherein the template module is further configured to:
access a document that includes a written test case;
derive control name information, type information, operation information, value information, or property information from the written test case; and
automatically insert the derived information into at least one row of the template that is associated with the written test case.

11. The system of claim 8, wherein the template module is configured to receive the information contained in the template the received information represents information from a user associated with the system under testing.

12. The system of claim 8, wherein the template module is configured to access the information from a spreadsheet that associates the rows to the test cases; and
wherein the test script module includes a macro of the spreadsheet that generates the test script.

13. The system of claim 8, wherein the translation module is configured to apply a different translation scheme to the accessed information; and
wherein the test script module is configured to generate a test script in the scripting language that is associated with the different translation scheme and that is based on the information accessed from the template.

14. The system of claim 8, wherein the test script module is configured to generate the test script that includes a code snippet associated with one of the rows of information from the template that is associated with one of the test cases to be applied to the system under testing.

15. A non-transitory machine-readable storage medium comprising instructions, when executed by at least one processor of a machine, cause the machine to perform operations, comprising:
accessing information from a template having entries associated with test cases, the template organizing the information for the test cases in a tabular form with rows associated with the test cases, the information specifying a scripting language for a translation scheme associated with at least one of the test cases;
applying the translation scheme to the accessed information for a test case to convert the information for the test case into the scripting language associated with the translation scheme for the test case; and
generating a test script in the scripting language associated with the translation scheme for the test case based on the accessed information from at least one row of the information associated with the test case in the template, the test script including instructions to be performed on the system under test (SUT) for the test case.

16. The non-transitory machine-readable storage medium of claim 15, wherein the accessed information from the template includes control name information, type information, operation information, value information, and property information associated with the test cases of the template.

17. The non-transitory machine-readable storage medium of claim 15, wherein the operation of generating the test script in the scripting language that is associated with the translation scheme for the test case includes generating a functional test script.

18. The non-transitory machine-readable storage medium of claim 15, wherein the operation of generating the test script in the scripting language that is associated with the translation scheme for the test case includes generating a regression test script.

* * * * *